(12) United States Patent
Huang

(10) Patent No.: US 9,303,996 B2
(45) Date of Patent: Apr. 5, 2016

(54) POINT OF INTEREST LOCATION DETERMINATION BASED ON APPLICATION USAGE

(71) Applicant: Apple Inc., Cupertino, CA (US)

(72) Inventor: Ronald K. Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 52 days.

(21) Appl. No.: 14/023,405

(22) Filed: Sep. 10, 2013

(65) Prior Publication Data

US 2015/0073709 A1   Mar. 12, 2015

(51) Int. Cl.
| | |
|---|---|
| *G01C 21/00* | (2006.01) |
| *G01C 21/20* | (2006.01) |
| *G01C 21/28* | (2006.01) |
| *G01C 21/36* | (2006.01) |
| *G06Q 30/02* | (2012.01) |
| *H04W 4/02* | (2009.01) |
| *G06F 9/44* | (2006.01) |
| *G06F 17/30* | (2006.01) |
| *H04L 29/08* | (2006.01) |
| *H04W 4/00* | (2009.01) |

(52) U.S. Cl.
CPC .............. *G01C 21/00* (2013.01); *G01C 21/206* (2013.01); *G01C 21/28* (2013.01); *G01C 21/3679* (2013.01); *G06F 8/00* (2013.01); *G06F 17/30* (2013.01); *G06Q 30/02* (2013.01); *H04L 67/22* (2013.01); *H04W 4/02* (2013.01); *H04L 67/34* (2013.01); *H04W 4/001* (2013.01)

(58) Field of Classification Search
CPC ......... H04N 5/232; G06F 15/18; G06F 17/30; G06F 8/00; G06N 5/04; H04M 1/72569; G06Q 10/10; G06Q 30/02; H04W 24/00; H04W 4/02; H04W 4/001; H04W 4/028; H04W 4/023; H04L 67/22; H04L 67/34; G01C 21/00

See application file for complete search history.

(56) References Cited

U.S. PATENT DOCUMENTS

2010/0198814 A1 * 8/2010 Petersen ................ G06Q 10/10
                                                      707/722
2011/0246148 A1   10/2011 Gupta et al.
(Continued)

FOREIGN PATENT DOCUMENTS

| EP | 2 393 056 | 12/2011 |
| WO | 2004/004372 | 1/2014 |

OTHER PUBLICATIONS

International Search Report and Written Opinion, International Application No. PCT/US2014/045615, Nov. 10, 2010, 10 pages.

*Primary Examiner* — Behrang Badii
(74) *Attorney, Agent, or Firm* — Fish & Richardson P.C.

(57) ABSTRACT

Techniques of determining a point of interest (POI) location using anonymous application usage data are described. A POI location determination system can determine geographic coordinates of a POI based on anonymous application usage data received from multiple mobile devices. The system can associate an application program with a POI. The anonymous application usage data can include an identifier or a category of the application program launched by the mobile devices, and a device location of each mobile device at time of launching the application program. Based on the device locations, the system can determine that launching of the application program is concentrated in a geographic area. The system can designate a centroid of the geographic area as a location of the POI.

25 Claims, 10 Drawing Sheets

(56) References Cited

U.S. PATENT DOCUMENTS

2012/0185419 A1* 7/2012 Kuhn ................ H04M 1/72569 706/12

2013/0337830 A1* 12/2013 Haro ....................... H04W 4/02 455/456.1

2014/0320674 A1* 10/2014 Kuang ............... H04N 5/23222 348/207.1

* cited by examiner

US 9,303,996 B2

POINT OF INTEREST LOCATION DETERMINATION BASED ON APPLICATION USAGE

TECHNICAL FIELD

This disclosure relates generally to location-based services.

BACKGROUND

An online map service can provide virtual maps to one or more mobile devices. The virtual maps can include point of interests (POIs). A POI can be a place that is designated as useful or of interest to a user. For example, a POI can be a shop, restaurant, or a hotel. Each POI may have an address (e.g., a street address). To display a POI in a virtual map, the online map service can geocode the POI, including determining a location (e.g., latitude and longitude coordinates) of the POI. An exemplary technique of geocoding is address interpolation. Upon determining the latitude and longitude coordinates of the address of the POI, the online map service can display a marker representing the POI on the virtual map at the latitude and longitude coordinates.

SUMMARY

Techniques of determining a POI location using anonymous application usage data are described. A POI location determination system can determine geographic coordinates of a POI based on anonymous application usage data received from multiple mobile devices. The system can associate an application program with a POI. The anonymous application usage data can include an identifier or a category of the application program launched by the mobile devices, and a device location of each mobile device at time of launching the application program. Based on the device locations, the system can determine that launching of the application program is concentrated in a geographic area. The system can designate a centroid of the geographic area as a location of the POI.

The features described in this specification can be implemented to achieve one or more advantages. For example, compared to a conventional geocoding system, a POI location determination system using anonymous application usage data can provide more accurate geographic coordinates of a POI. Geographic coordinates obtained through address interpolation can be verified and filtered, such that distortion in address interpolation caused by uneven geographic features (e.g., a large parking lot among comparatively small POIs) can be eliminated or reduced.

Compared to a conventional system, the system that determines a POI location using anonymous application usage data can provide information that is more meaningful to a user. For example, when a user searches for a hotel, the system described in this specification can provide a location of the hotel lobby to the user, instead of a center of the hotel (which maybe a hotel room). Although the center of the hotel is technically a correct location of the hotel, directing a user to the lobby can be more helpful.

In addition to determining a location of a POI, the system can determine operation hours of a POI. For example, the system can determine business hours of a restaurant or a store during a weekday and during a weekend day. The system can provide the location and business hours of a POI to a user as a user convenience feature.

The features described in this specification can be implemented to maximize privacy protection of users. In implementations where the operations are performed by a server, the server needs no more information from a mobile device than a location and an identifier of the application program being launched. In particular, the server does not need and does not collect any user specific information.

The details of one or more implementations of POI location determination based on anonymous application usage data are set forth in the accompanying drawings and the description below. Other features, aspects, and advantages of POI location determination based on anonymous application usage data will become apparent from the description, the drawings, and the claims.

BRIEF DESCRIPTION OF THE DRAWINGS

Like reference symbols in the various drawings indicate like elements.

DETAILED DESCRIPTION

Exemplary Use Cases

Figure 1:
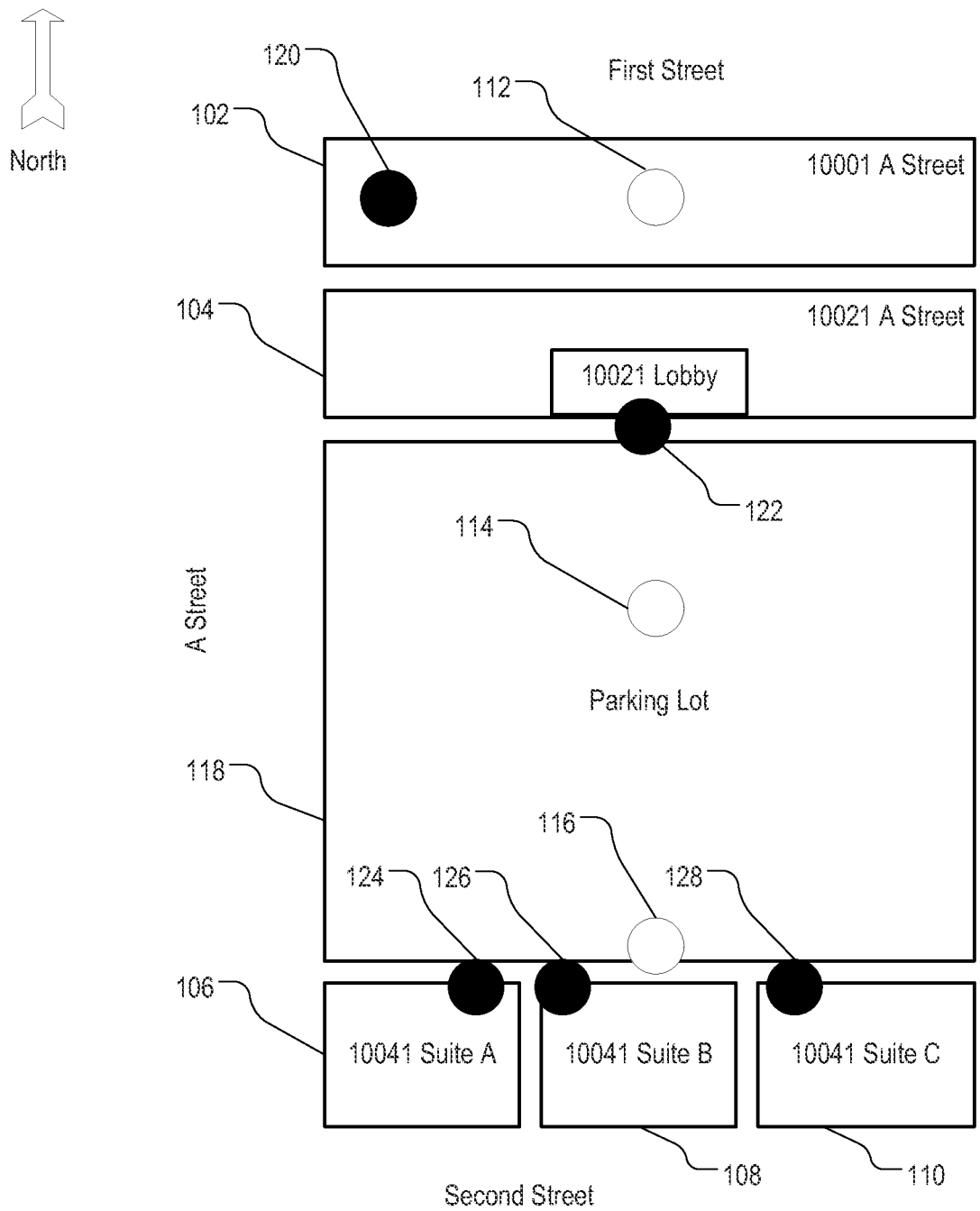
FIG. 1 is a diagram illustrating an exemplary use case of determining locations of POIs distributed unevenly in a street.

FIG. 1 is a diagram illustrating an exemplary use case of determining locations of POIs distributed unevenly in a street. A POI display program can display a virtual map of a geographic area including three streets: A Street (going north-south), and cross streets First Street and Second Street, each going east-west. The POI display program identifies five exemplary points of interests, e.g., shops, hotels, or doctor's offices, in the area displayed. The five POIs are shown in table 1 below. Each POI can initially be associated with an interpolated location.

TABLE 1

Exemplary POIs

| POI | Address | Interpolated location | App Usage Location |
|---|---|---|---|
| POI 102 | 10001 A Street | Location 112 | Location 120 |
| POI 104 | 10021 A Street | Location 114 | Location 122 |
| POI 106 | 10031 A Street, Suite A | Location 116 | Location 124 |

TABLE 1-continued

Exemplary POIs

| POI | Address | Interpolated location | App Usage Location |
|---|---|---|---|
| POI 108 | 10031 A Street, Suite B | Location 116 | Location 126 |
| POI 110 | 10031 A Street, Suite C | Location 116 | Location 128 |

The system can determine the interpolated locations of each of the POIs using address interpolation. For example, using geographic data from a map database, the system can determine geographic coordinates (e.g., latitude and longitude coordinates of northwest, northeast, southeast, and southwest corners) that define A Street. The system can determine that five street addresses (as shown in Table 1 above) are located on east side of A Street, each street address corresponding to one or more POIs.

The system can determine that the addresses are located between First Street and Second Street. The system can determine interpolated locations 112, 114, and 116 of three addresses (10001, 10021, 10041, A Street, City X, State Y) based on the northeast point and southeast point of A Street. The system can determine that locations 112, 114, and 116 correspond to addresses 10001, 10021, and 10041 of A Street, respectively. Accordingly, the system can assign interpolated location 112 (having geographic coordinates "lat 1" and "long 1") to POI 102, assign interpolated location 114 (lat 2, long 2) to POI 104. The system can determine that POIs 106, 108, and 110 share a same street number (10041 A Street Suite A, Suite B, and Suite C, respectively). In response, the system can determine that POIs 106, 108, and 110 share a same interpolated location 116.

Interpolated locations 112, 114, and 116 may not be accurate locations of the POIs. For example, a large space having no street address (e.g., parking lot 118) can disrupt address interpolation. In addition, the system may not have knowledge of internal structures of a building at street address "10041, A street" (e.g., where suite A, suite B, and suite C are located). The system can correct or improve the interpolated locations by crowd sourcing using anonymous application usage data received from multiple mobile devices.

Each of the POIs 102 through 110 may be a business that provides application programs to mobile devices through an application distribution service (e.g., an online application store) of the system. For example, POI 102 may be a coffee shop having an application program linked to a payment system. The application program, when executing on a smart phone, can cause the payment system to pay the coffee shop for a cup of coffee. An application provider (e.g., an operator of the coffee shop) can upload the application program to the online application store of the system. Each application program can have metadata (e.g., a name or description) associated with the respective POI. A mobile device can download the application program from the online application store.

The mobile device can submit to the system anonymous application usage data. The anonymous application usage data can include an identifier or a category of the application program being executed, a location of the mobile device at time of executing the application program, and a timestamp of the execution. The system can determine a POI is associated with the application program based on the application identifier, the metadata of the application program, and a POI name or POI category in a POI database.

For example, the system can receive an application program identifier "12345" from a mobile device indicating that application program "12345" is launched by the mobile device. The system can determine, based on metadata of the application program, that a name or description of the application program includes a text string "ABC Coffee." The system can determine that the text string matches a name of POI 102 as stored in a POI database. The system can then determine that a location associated with the application program identifier "12345" as received from the mobile device may be at or near POI 102, and a timestamp associated with the application program identifier "12345" as received from the mobile device may be inside of the operation hours of POI 102.

Upon receiving a statistically significant number of application program identifiers and associated locations, the system can determine that the associated locations are concentrated around location 120. The system can determine that the concentration indicates that a location of POI 102 is at location 120. The system can designate location 120 as the location of POI 102, including replacing the interpolated location 112 of POI 102 with location 120.

The system can determine location 122 is a location of POI 104 upon detecting multiple launches of a particular category of application programs related to POI 104. The system can determine that the POI category of POI 104 is "hotel." The system can determine that, in a particular area of POI 104, a particular category of applications are launched more frequently than application programs of other categories.

For example, the system can determine that X percent of application programs launched in the area belong to a particular category (e.g., "travel"). The system can determine that the value of X satisfies a threshold value (e.g., 90, indicating at least 90% of the application programs launched in the area are related to travel). In contrast, the system can determine that categories of application programs launched at other areas nearby are evenly distributed among "games," "travel," "business," "news," and "sports." In response, the system can determine that the area in which the particular category of application programs are launched is a lobby area, where users are more likely to search travel-related information (e.g., flight information or hotel rates). The system can determine that the other areas are hotel rooms, where people relax or do business. The system can determine that a lobby area is more useful to a user. Accordingly, the system can designate location 122 as the location of POI 104 based on locations where the category of application programs are launched.

Likewise, by using anonymous application usage data, the system can determine location 124 of POI 106, location 126 of POI 108, and location 128 of POI 110. Accordingly, the system can distinguish the different locations of POIs 106, 108, and 110 even when POIs 106, 108, and 110 have a same street number but are located in different suites of a same building.

Figure 2:
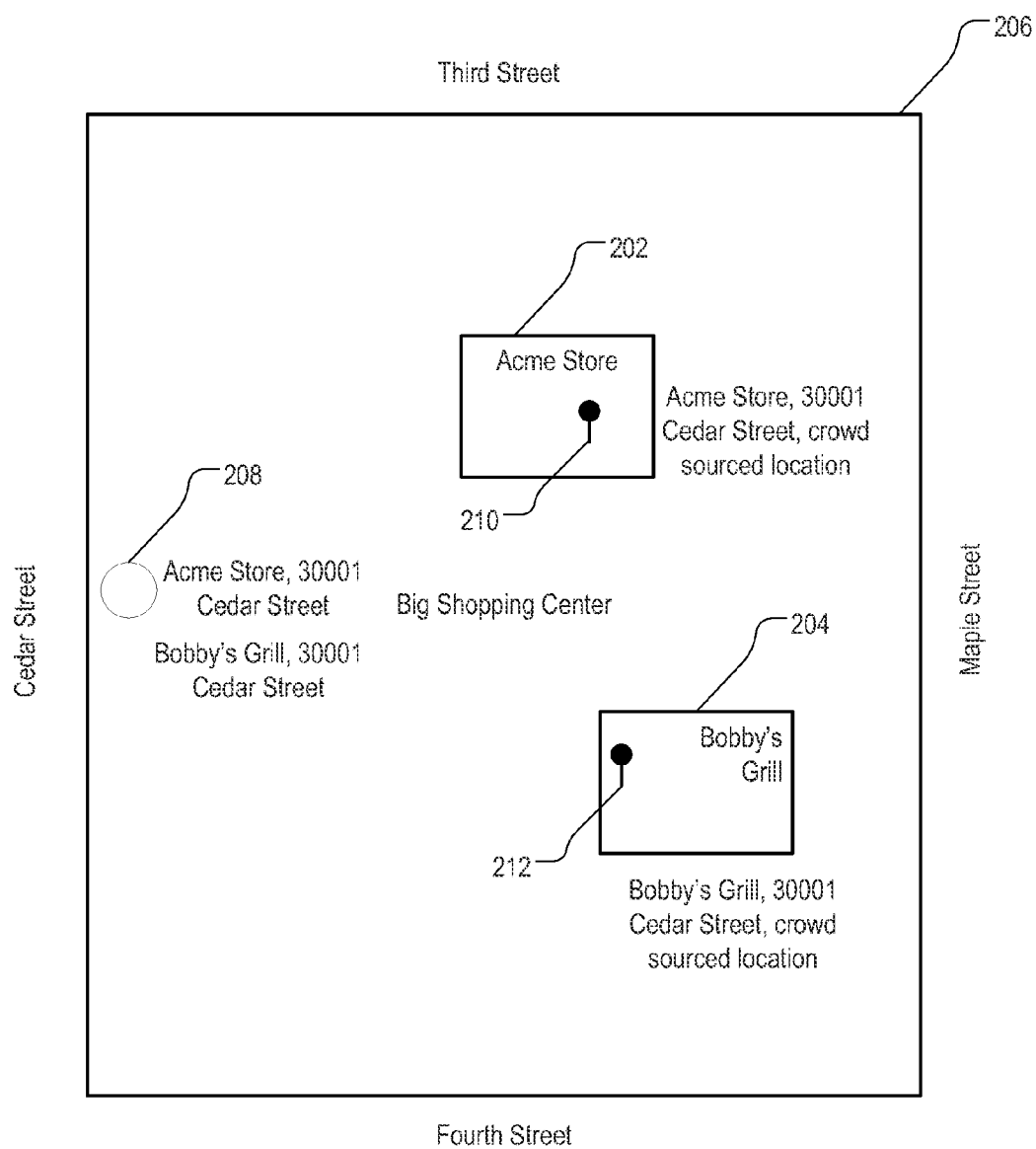
FIG. 2 is a diagram illustrating an exemplary use case of determining locations of different POIs having a same address.

FIG. 2 is a diagram illustrating an exemplary use case of determining locations of different POIs having a same address. A POI location determination system can determine that multiple POIs have a same address. For example, the system can determine that POI 202 ("Acme Store") and POI 204 ("Bobby's Grill") have a same street address ("30001 Cedar Street, City X, State Y"). POI 202 and POI 204 can have the same street address when, for example, each of POI 202 and POI 204 is a franchise of a store chain, and operates at a same venue 206. Venue 206 can be, for example, a shopping mall, an airport, or a food court. Using address interpolation, the system determines that both POI 202 and POI 204 have a same interpolated location 208.

The store chains that granted franchise rights to POI 202 and POI 204 can each distribute an application program that can be activated upon entering into a franchise. For example, a wireless beacon placed at POI 202 can trigger a mobile device entering POI 202 to display an icon of an application program prominently (e.g., displayed on an initial home page upon power up). The application program can display items on sale across the store chain. Likewise, an icon of an application program can be displayed prominently on a mobile device entering POI 204 to show chain-wide daily specials.

The mobile devices that launch the application programs can anonymously submit anonymous application usage data to the POI location determination system. Upon receiving sufficient amount of anonymous application usage data, the system can determine that POI 202 is associated with location 210, and that POI 204 is associated with location 212.

A mobile device can submit a request to the system to search for a POI. The request may include a current location of the mobile device and a query "Acme Store" or "Bobby's Grill." Based on the current location and the query, the system can identify POI 202 or POI 204. The system can provide a virtual map that includes venue 206 and nearby streets to the mobile device. Instead of providing interpolated location 208 to the mobile device, the system can provide location 210 or location 212. The system can cause the mobile device to display a location marker (e.g., a virtual pin) at 210 or location 212, to indicate the locations of POI 202 and POI 204.

Figure 3:
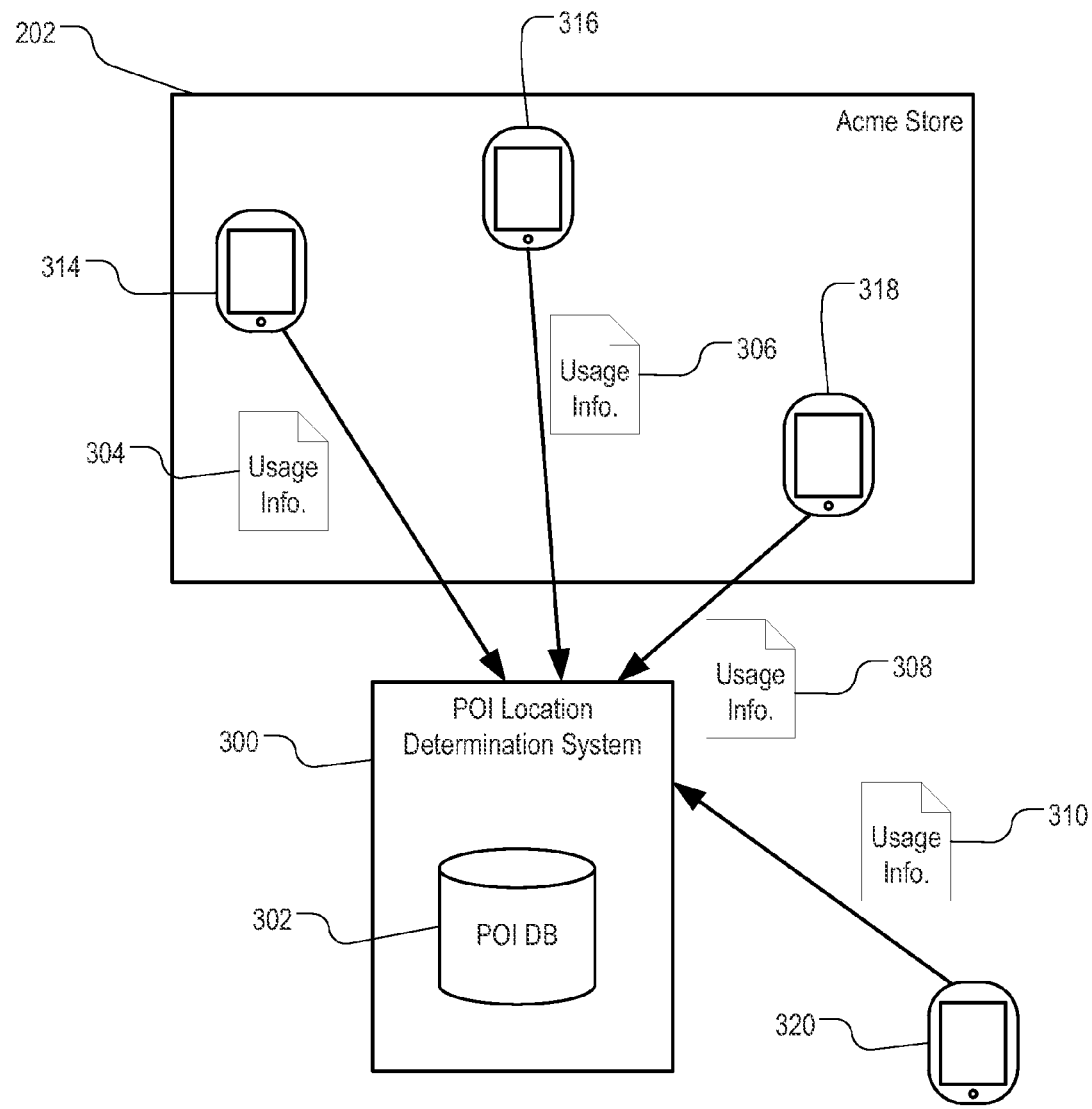
FIG. 3 is a diagram illustrating exemplary techniques of determining a location of a POI using crowd source data.

FIG. 3 is a diagram illustrating exemplary techniques of determining a location of a POI using crowd source data. Crowd source data can include anonymous application usage data received by system 300 from multiple mobile devices. System 300 is a POI location determination system as described above in reference to FIG. 1 and FIG. 2. System 300 can include POI database 302. POI database 302 can store names and addresses of POIs. The names and addresses may be provided by a data vendor. The POIs in POI database 302 may or may not be geocoded. One of the POIs can be POI 202 ("Acme Store" of FIG. 2) located at 30001 Cedar Street.

System 300 can receive anonymous application usage data 304, 306, 308, and 310 from mobile devices 314, 316, 318, and 320, respectively. Anonymous application usage data 304, 306, 308, and 310 include anonymous information on application program execution on the respective mobile device. Application programs executed on the mobile devices can include an application program ("Acme App") distributed by the Acme store chain. Acme App may be executed at various locations. Acme App is launched most frequently by mobile devices located in an Acme store in the store chain, e.g., POI 202 ("Acme Store"). System 300 can determine that Acme App launches are concentrated in a geographic area (e.g., a portion of "Acme Store" in venue 206 of FIG. 2). System 300 can determine a centroid location of mobile devices 314, 316, and 318. In some implementations, the centroid location can be an average of locations of mobile devices 314, 316, and 318 at respective launch time of Acme App. System 300 can exclude a location of mobile device 320 upon determining that mobile device 320 launched Acme App at an outlier location (e.g., a location where only relatively few launches of Acme App occurred).

In addition, system 300 can determine that Acme App launches are concentrated in a time period (e.g., 9:00 am through 8:00 pm) at POI 202 during weekdays. System 300 can determine that, outside of the time period, Acme App is launched at random locations and at random times rather than concentrated at POI 202. Upon making these observations, system 300 can determine that POI 202 has operation hours corresponding to the time period. System 300 can store the operation hours and centroid location in association with POI 202 in POI database 302.

Figure 4:
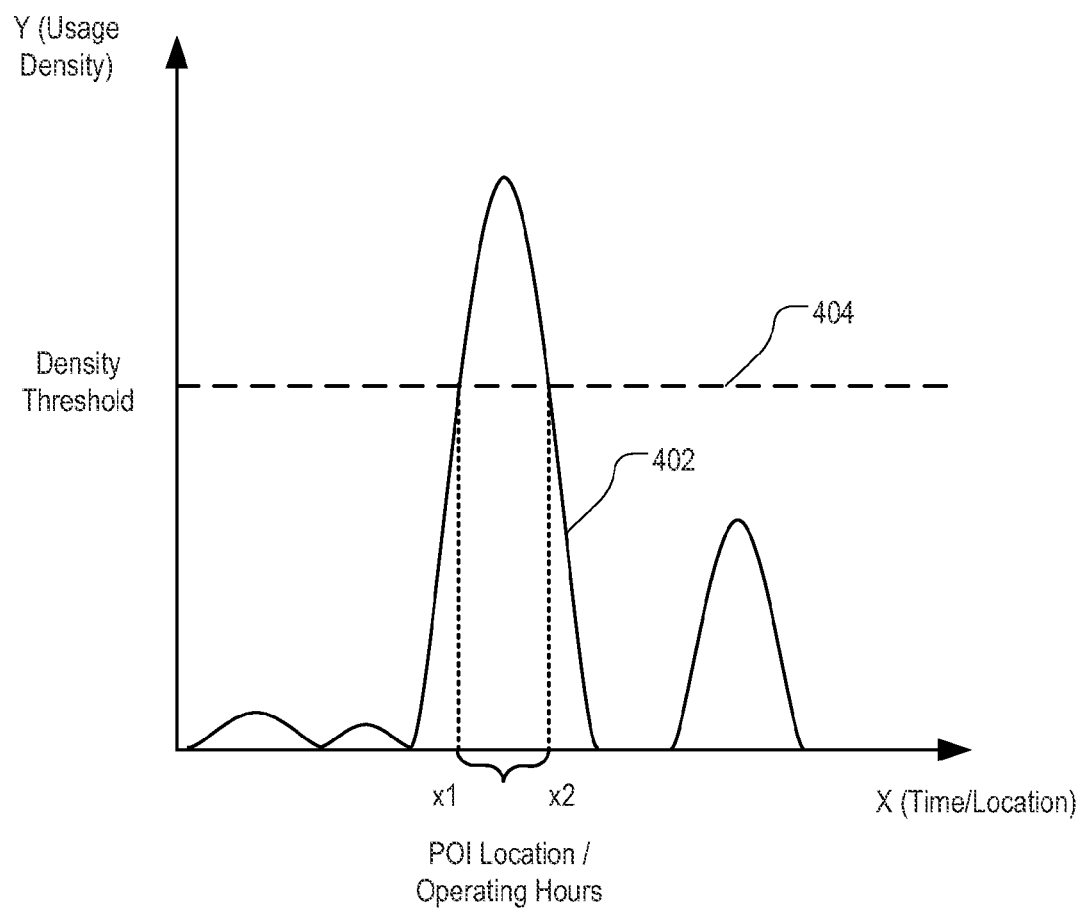
FIG. 4 is a diagram illustrating exemplary techniques of determining a location of a POI based on an application usage density threshold.

FIG. 4 is a diagram illustrating exemplary techniques of determining a location of a POI based on an application usage density threshold. System 300 (of FIG. 3) can determine a distribution of usage of an application program (e.g., Acme App) over time, area, or space. For convenience, the time, area, or space is represented as a one-dimensional X-axis in FIG. 4. In various implementations, the distribution can be over a geographic area defined by latitude and longitude coordinates, or a geographic space defined by latitude, longitude, and altitude coordinates.

A Y-axis in FIG. 4 represents a usage density. The usage density can be a number of executions of the application program in a unit time (e.g., a ten-minute time window), a unit area (e.g., a ten feet long by ten feet wide geographic area), or a unit space (e.g., a ten feet long by ten feet wide by ten feet high space). System 300 can determine the usage density by determining a spread of time or location received in the anonymous application usage data over a period of time (e.g., one day). For example, system 300 determines, based on the anonymous application usage data, that at various time during a day, K mobile devices have launched Acme App. In addition, system 300 determines that the locations of the launches are within ten feet of one another. System 300 can determine that the usage density for a 100 square feet geographic area enclosing the K launches is K launches per 100 square feet.

Based on crowd source data, system 300 can determine usage distribution 402. Usage distribution 402 can be usage density distribution over time, area, or space. System 300 can determine that, at a particular time or location (between x1 and x2 on the X-axis), the usage density exceeds density threshold 404. Density threshold 404 can be a time-based density threshold value (e.g., M application launches per ten minutes) or location-based density threshold value (e.g., N application launches per 100 square feet area). The time-based density threshold value and location-based density threshold value may or may not have a same numerical value. Based on the density threshold value and the usage distribution, system 300 can determine a POI location or POI operation hours.

For example, system 300 can determine that, in a 600 square feet area in venue 206 (of FIG. 2), a location-based density of launching application program Acme App exceeds N per 100 square foot. System 300 can then determine location 210 of POI 202 using a centroid of the 600 square feet area or using a centroid location of individual locations of the mobile devices launching Acme App.

Likewise, system 300 can determine that, in a time period between 9:00 am and 8:00 pm on weekdays, a time-based density of launching application program Acme App exceeds M per ten minutes. System 300 can then determine the operation hours of POI 202 are 9:00 am to 8:00 pm on weekdays.

Figure 5:
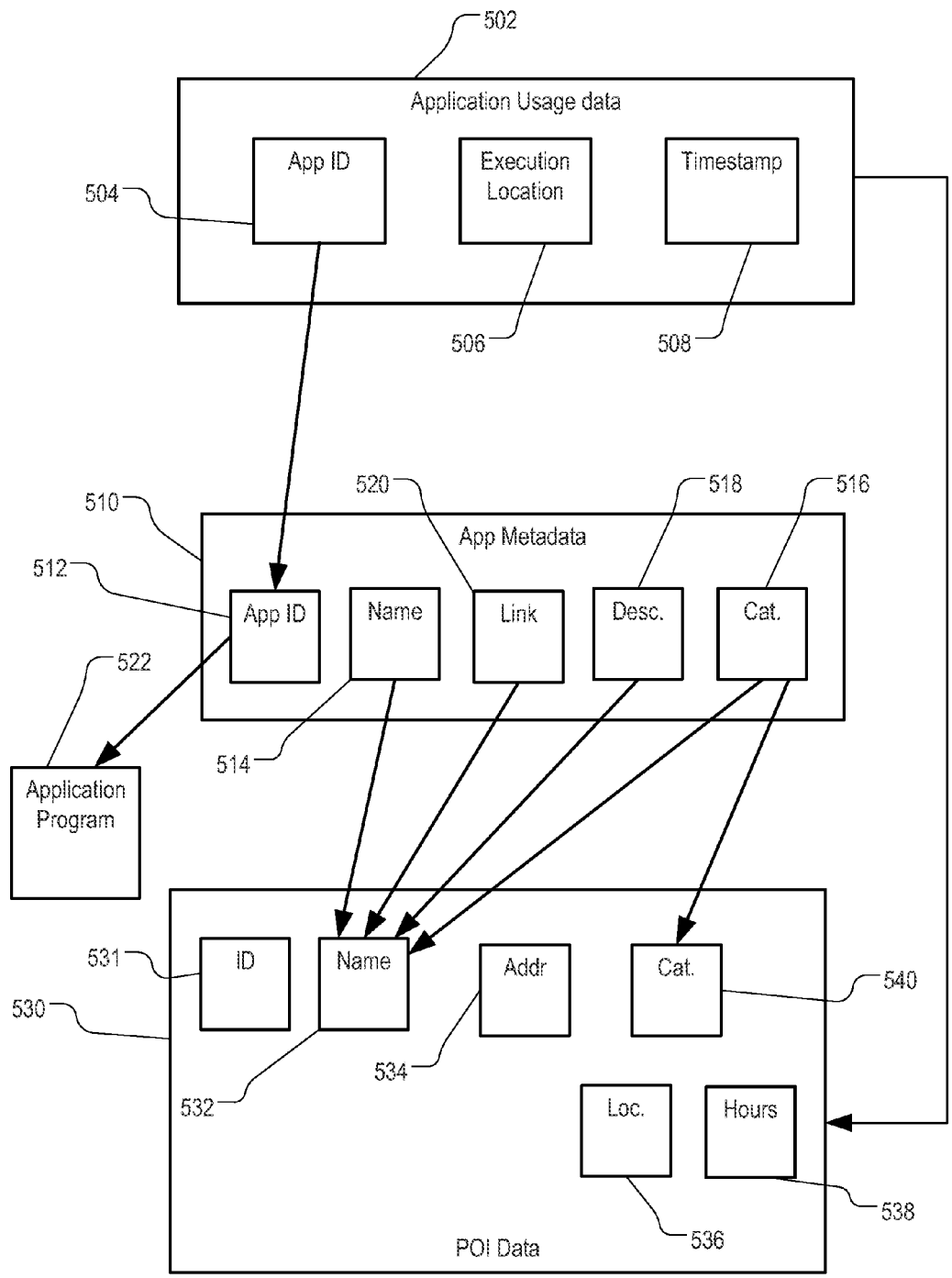
FIG. 5 is a block diagram illustrating exemplary relations between anonymous application usage data, application metadata, and POI data.

FIG. 5 is a block diagram illustrating exemplary relations between anonymous application usage data, application metadata, and POI data. Anonymous application usage data 502 can be data submitted by mobile devices (e.g., mobile devices 314 through 320 of FIG. 3) to a POI location determination system (e.g., system 300 of FIG. 3). Anonymous application usage data 502 can include application identifier 504, device location 506, and timestamp 508. Application identifier 504 can be a system identifier of the application being launched. Device location 506 can include a geographic location of the mobile device at time of launching the application program, at time of closing the application program, or at a time between launching and closing the application program. The geographic location can include latitude, longitude, and altitude coordinates. Timestamp 508 can include a time the application program is launched, a time the application program is closed, or both.

System 300 can determine application metadata 510 based on application programs submitted to an application store by an application provider for distribution to the mobile devices. Application metadata 510 can include application identifier 512, application name 514, application category 516, application description 518, and application link 520. Application identifier 512 can be an identifier of application program 522. Application name 514 can include a name (e.g., a display name) of application program 522. Application category 516 can include a category of application program 522 as provided by a provider of application program 522 (e.g., by uploading application program 522 into a category of an application store). Application description 518 can include a description of application program 522 (e.g., as submitted by a provider of application program 522 for approval of application program 522). Application link 520 can include a link (e.g., a web link to a web site).

System 300 can store POI data 530. POI data 530 can include POI identifier 531, POI name 532, POI address 534, POI location 536, POI operation hours 538, and POI category 540. POI identifier 531 can be a unique identifier for a POI. POI name 532 (e.g., "Acme Store") can be shared by multiple POIs. POI address 534 can include a street address of the POI. POI location 536 can include a location determined by anonymous application usage data, or, when anonymous application usage data are unavailable for a POI, a location determined by address interpolation. POI operation hours 538 can include one or more time periods that a POI is open to people (e.g., park hours or business hours). POI category 540 can include a category (e.g., parks, hotel, or restaurant) of a POI.

System 300 can associate anonymous application usage data 502 to POI data 530 through application metadata 510. Using application identifier 504 in an entry in anonymous application usage data 502, system 300 can identify an entry in application metadata 510 by matching the application identifier 504 with application identifier 512. System 300 can associate the entry of application metadata 510 to an entry in POI data 530 by parsing application name 514, application category 516, application description 518, and application link 520 and matching a result of the parsing with POI name 532. In some implementations, system 300 can associate the entry of application metadata 510 to an entry in POI data 530 based on category. For example, the system can determine that an entry in application metadata 510 has application category 516 indicating "travel" and an entry in POI data has POI category 540 indicating "hotel." In response, the system can associate the two entries.

One entry of application metadata 510 can be associated with one or more entries of POI data 530. For example, an entry in application in metadata 510 for Acme App can be associated with many franchise stores of the Acme store chain. One entry of POI data 530 can be associated with one or more entries of application metadata 510. For example, an entry in POI data 530 for a hotel can be associated with multiple application programs having a particular application category (e.g., "travel"). Associating application metadata 510 and POI data 530 can be performed before or after system 300 receives anonymous application usage data 502. Through associations between anonymous application usage data 502 and application metadata 510 and associations between application metadata 510 and POI data 530, POI system can associate anonymous application usage data 502 with POI data 530.

A mobile device can submit anonymous application usage data 502 to system 300 upon launching an application program or closing an application program. Upon receiving anonymous application usage data 502, system 300 can calculate POI location 536 and operation hours 538 of a POI related to the application program based on device location 506 and timestamp 508 of the received anonymous application usage data 502. In case multiple POIs are related to the application program, system 300 can use locations of the POIs as determined using address interpolation to filter the POIs. For example, system 300 can select a POI the interpolated location of which is closest to the location as determined based on device location 506 and filter out other POIs.

Exemplary System Components

Figure 6:
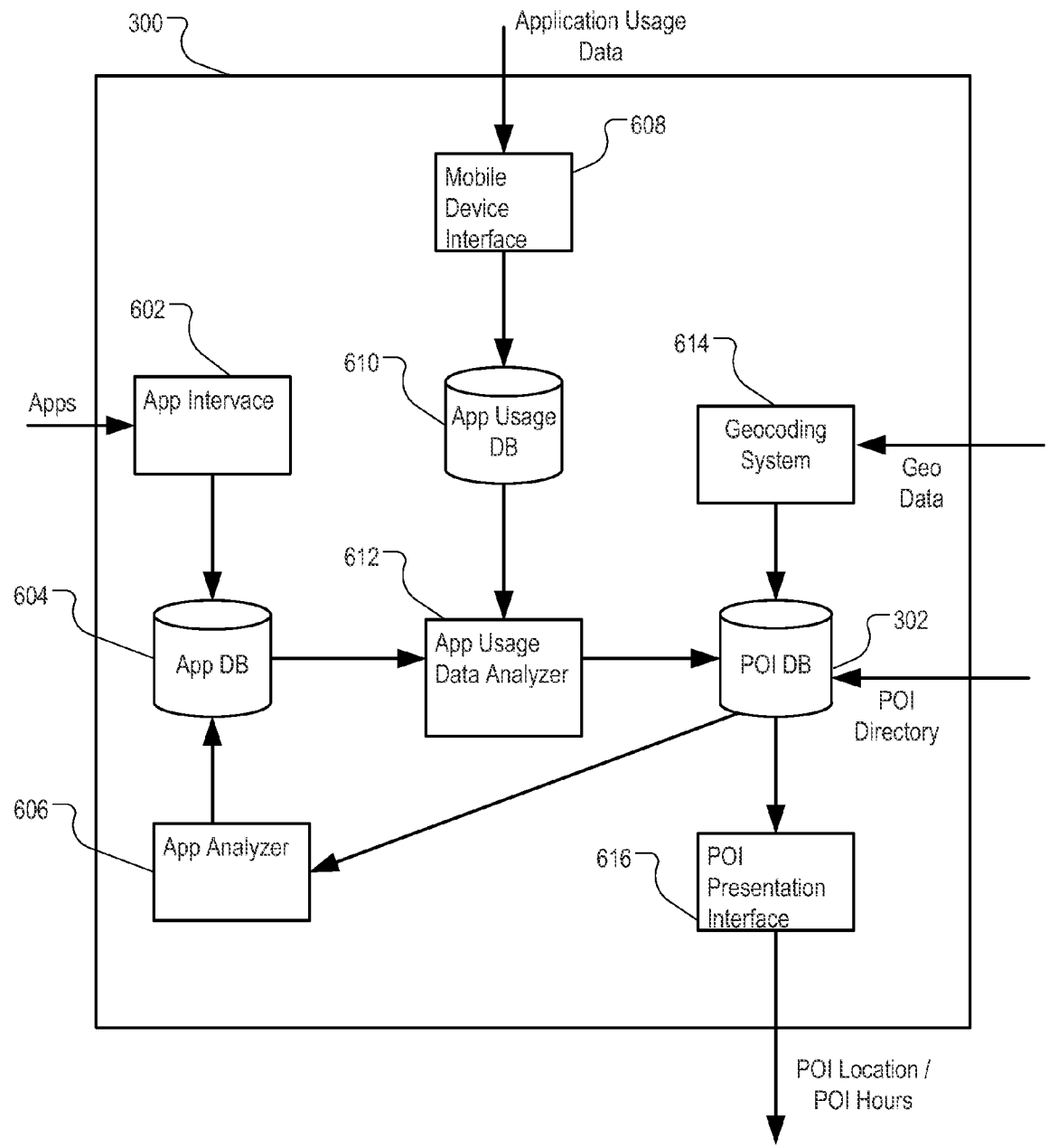
FIG. 6 is a block diagram illustrating exemplary components of a POI location determination system.

FIG. 6 is a block diagram illustrating exemplary components of POI location determination system 300. Each component of system 300 can include hardware and software (or firmware) components. System 300 can be implemented on a mobile device, a server device coupled with a mobile device, or both.

System 300 can include application interface 602. Application interface 602 is a component of system 300 configured to receive application programs, and associated application metadata, from application providers. Application interface 602 can store the received application programs and application metadata in application database 604.

System 300 can include application analyzer 606. Application analyzer 606 is a component of system 300 configured to parse the application metadata stored in application database 604, and to determine if an application program is associated with a POI stored in POI database 302. Application analyzer 606 can determine an association by matching at least a portion of the application metadata with a name or web link of a POI, or by matching an application category and a POI category. The name and category of the POI can be provided by a commercial data provider. In some implementations, application analyzer 606 can associate an application program and a POI based on rules defining matches between an application category and a POI category.

System 300 can include mobile device interface 608. Mobile device interface 608 is a component of system 300 configured to receive anonymous application usage data from multiple mobile devices, aggregate the received anonymous application usage data (e.g., by an application identifier, an application category, or both), and store the aggregated anonymous application usage data in anonymous application usage database 610.

System 300 can include anonymous application usage data analyzer 612. Anonymous application usage data analyzer 612 is a component of system 300 configured to read aggregated anonymous application usage data from anonymous application usage database 610, map the aggregated anonymous application usage data to a POI stored in POI database 302 based on the association between an application program and the POI, and determine a location of the POI based on the aggregated anonymous application usage data. In addition, anonymous application usage data analyzer 612 can determine operation hours of the POI. Anonymous application usage data analyzer 612 can store the location and operating hour in POI database 302.

System 300 can include geocoding system 614. Geocoding system 614 is a component of system 300 configured to geocode each POI using an address of the POI and geographic data. Geocoding system 614 can determine an interpolated location of a POI using address interpolation based on the address and the geographic data. Anonymous application usage data analyzer 612 can use the interpolated location to filter POIs if multiple POIs are associated with an application program. If anonymous application usage data are unavailable for a POI, system 300 can use the interpolated location of that POI as a default location of the POI.

System 300 can include POI presentation interface 616. POI presentation interface 616 is a component of system 300 configured to present the location of a POI or operation hours of a POI to a mobile device, for example, for display on a virtual map. POI presentation interface 616 can provide the location or operation hours in response to a search request from the mobile device, or in response to a request to display a map of points of interests.

Exemplary Procedures

Figure 7:
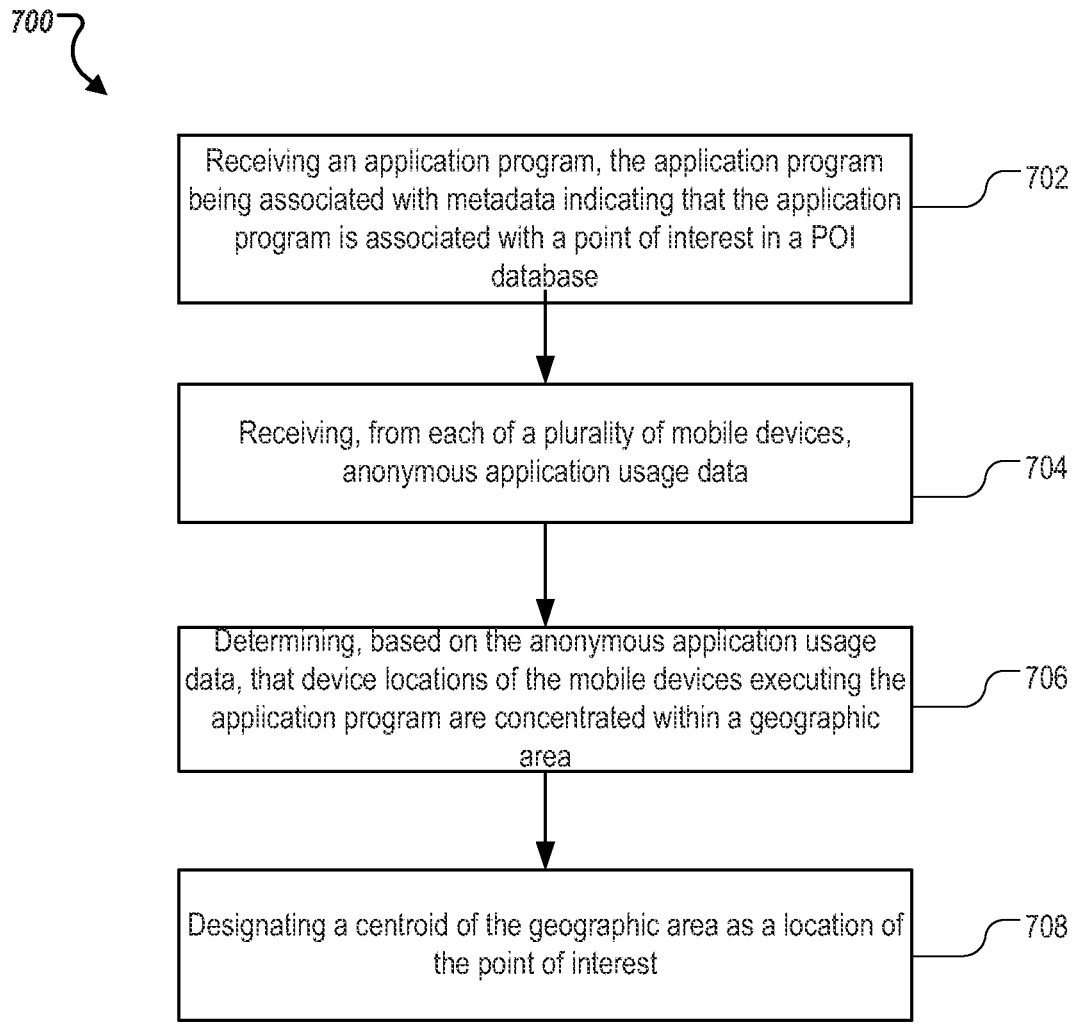
FIG. 7 is a flowchart illustrating an exemplary procedure of POI location determination based on application usage.

FIG. 7 is a flowchart illustrating exemplary procedure 700 of POI location determination based on application usage. Procedure 700 can be performed by a POI location determination system, e.g., system 300 of FIG. 6.

The system can receive (702), using application interface 602 of FIG. 6, an application program. The application program can be associated with metadata indicating that the application program is associated with a point of interest in a POI database (e.g., POI database 302 of FIG. 6). The application program can be program submitted to an application store by an application provider for distribution to mobile devices. The metadata can include at least one of an icon, a name, a description, a category, or a link to the POI. The metadata can indicate that the application program is associated with the point of interest by indicating that the application program may be executed by the mobile device at a place designated as the point of interest, e.g., by containing a text string of a name of the POI.

The system can receive (704), using mobile device interface 608 of FIG. 6 and from multiple mobile devices, anonymous application usage data. The anonymous application usage data can indicate an event of executing the application program by a respective mobile device. The event can be associated with a device location. The device location can be a location of the respective mobile device at time of executing the application program by the respective mobile device. In some implementations, each event in the anonymous application usage data is associated with a launch timestamp. The launch timestamp can indicate a time of the respective mobile device executing the application program.

The system can determine (706), using anonymous application usage data analyzer 612 of FIG. 6 and based on the anonymous application usage data, that device locations of the mobile devices executing the application program are concentrated within a geographic area. Determining that the device locations are concentrated within the geographic area can include determining a location-based usage density of the device locations (as described in reference to FIG. 4). The system can determine that, in the geographic area, the location-based usage density satisfies a threshold location density value. In response, the system can determine that the device locations are concentrated within the geographic area.

The system can designate (708), in POI database 302 of FIG. 6, a centroid of the geographic area as a location of the POI. The system can provide the location of the point of interest to a mobile device for display on a map.

In some implementations, the system can determine, based on the launch timestamps, that executions of the application program are concentrated within one or more time periods. The system can determine the one or more time periods based on a daily, weekly, or monthly pattern. The system can then designate, in the POI database, the one or more time periods as operation hours of the point of interest. The system can determine an opening, a closing, or a relocation of the point of interest based on a change in pattern of the one or more time periods.

For example, the system can determine that anonymous application usage data indicate that mobile devices start visiting a location for a threshold period of time (e.g., X weeks). In response, the system can determine a POI has recently opened at the location. The system can determine that anonymous application usage data indicate that mobile devices no longer visit a POI for a threshold amount of time (e.g., X weeks). In response, the system can determine that the POI is closed to the public or has relocated.

Exemplary Mobile Device Architecture

Figure 8:
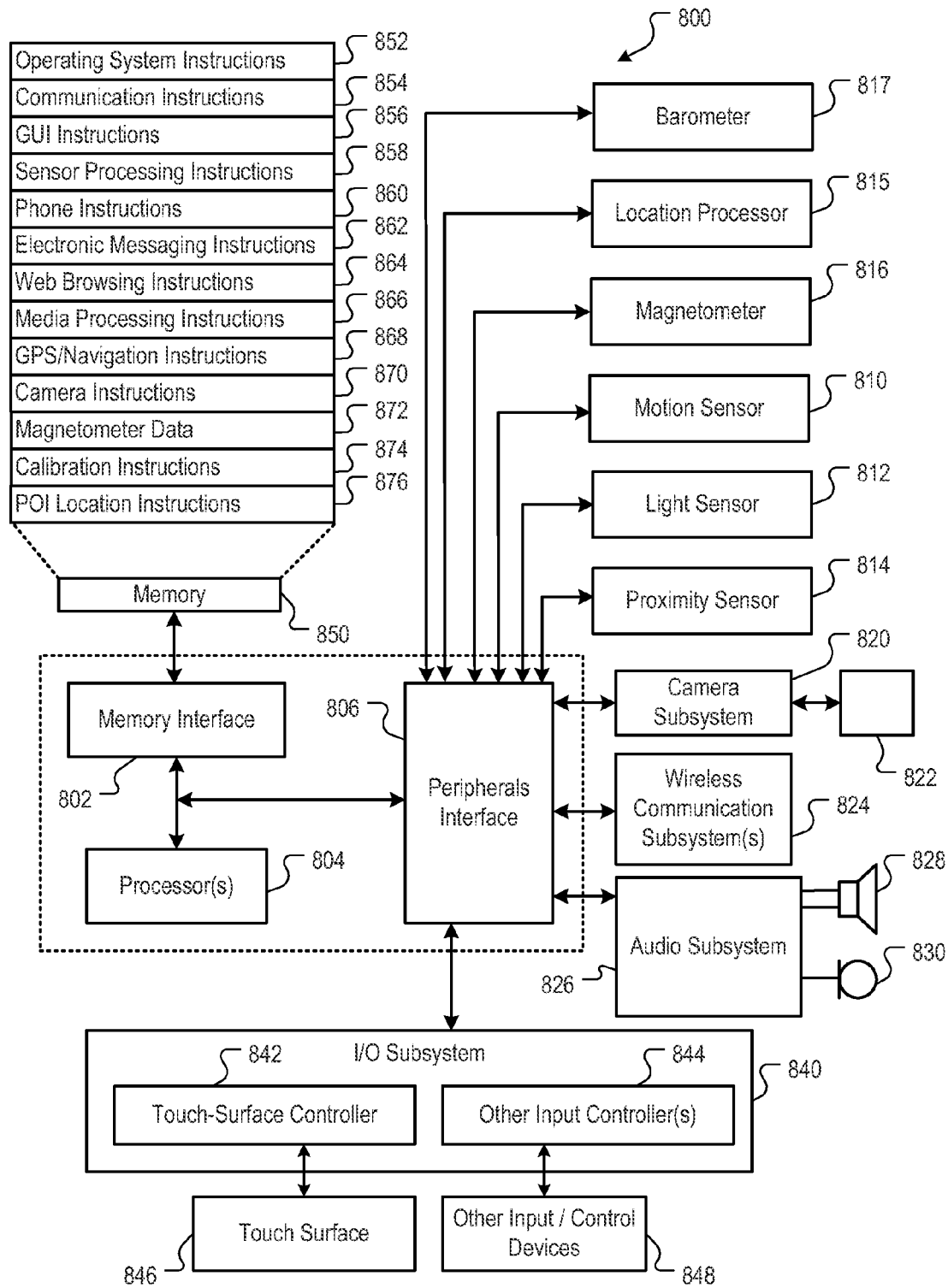
FIG. 8 is a block diagram illustrating an exemplary device architecture of a mobile device implementing the features and operations of FIGS. 1-7.

FIG. 8 is a block diagram illustrating exemplary device architecture 800 of a mobile device implementing the features and operations of FIGS. 1-7. A mobile device (e.g., mobile device 314, 316, 318, or 320 as described in reference to FIG. 3) can include memory interface 802, one or more data processors, image processors and/or processors 804, and peripherals interface 806. Memory interface 802, one or more processors 804 and/or peripherals interface 806 can be separate components or can be integrated in one or more integrated circuits. Processors 804 can include application processors, baseband processors, and wireless processors. The various components in the mobile device, for example, can be coupled by one or more communication buses or signal lines.

Sensors, devices, and subsystems can be coupled to peripherals interface 806 to facilitate multiple functionalities. For example, motion sensor 810, light sensor 812, and proximity sensor 814 can be coupled to peripherals interface 806 to facilitate orientation, lighting, and proximity functions of the mobile device. Location processor 815 (e.g., GPS receiver) can be connected to peripherals interface 806 to provide geopositioning. Electronic magnetometer 816 (e.g., an integrated circuit chip) can also be connected to peripherals interface 806 to provide data that can be used to determine the direction of magnetic North. Thus, electronic magnetometer 816 can be used as an electronic compass. Motion sensor 810 can include one or more accelerometers configured to determine change of speed and direction of movement of the mobile device. Barometer 817 can include one or more devices connected to peripherals interface 806 and configured to measure pressure of atmosphere around the mobile device.

Camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which a mobile device is intended to operate. For example, a mobile device can include communication subsystems 824 designed to operate over a GSM network, a GPRS network, an EDGE network, a Wi-Fi™ or WiMAX™ network, and a Bluetooth™ network. In particular, the wireless communication subsystems 824 can include hosting protocols such that the mobile device can be configured as a base station for other wireless devices.

Audio subsystem 826 can be coupled to a speaker 828 and a microphone 830 to facilitate voice-enabled functions, such as voice recognition, voice replication, digital recording, and telephony functions. Audio subsystem 826 can be configured to receive voice commands from the user.

I/O subsystem 840 can include touch surface controller 842 and/or other input controller(s) 844. Touch surface controller 842 can be coupled to a touch surface 846 or pad. Touch surface 846 and touch surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 846. Touch surface 846 can include, for example, a touch screen.

Other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of speaker 828 and/or microphone 830.

In one implementation, a pressing of the button for a first duration may disengage a lock of the touch surface 846; and a pressing of the button for a second duration that is longer than the first duration may turn power to the mobile device on or off. The user may be able to customize a functionality of one or more of the buttons. The touch surface 846 can, for example, also be used to implement virtual or soft buttons and/or a keyboard.

In some implementations, a mobile device can present recorded audio and/or video files, such as MP3, AAC, and MPEG files. In some implementations, the mobile device can include the functionality of an MP3 player. The mobile device may, therefore, include a pin connector that is compatible with the iPod. Other input/output and control devices can also be used.

Memory interface 802 can be coupled to memory 850. Memory 850 can include high-speed random access memory and/or non-volatile memory, such as one or more magnetic disk storage devices, one or more optical storage devices, and/or flash memory (e.g., NAND, NOR). Memory 850 can store operating system 852, such as Darwin, RTXC, LINUX, UNIX, OS X, WINDOWS, iOS, or an embedded operating system such as VxWorks. Operating system 852 may include instructions for handling basic system services and for performing hardware dependent tasks. In some implementations, operating system 852 can include a kernel (e.g., UNIX kernel).

Memory 850 may also store communication instructions 854 to facilitate communicating with one or more additional devices, one or more computers and/or one or more servers. Memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes and instructions; camera instructions 870 to facilitate camera-related processes and functions; magnetometer data 872 and calibration instructions 874 to facilitate magnetometer calibration. The memory 850 may also store other software instructions (not shown), such as security instructions, web video instructions to facilitate web video-related processes and functions, and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 850. Memory 850 can store POI location instructions 876. POI location instructions 876, upon execution, can cause processor 804 to collect anonymous application usage data and submit the anonymous application usage data to a POI location determination system.

Each of the above identified instructions and applications can correspond to a set of instructions for performing one or more functions described above. These instructions need not be implemented as separate software programs, procedures, or modules. Memory 850 can include additional instructions or fewer instructions. Furthermore, various functions of the mobile device may be implemented in hardware and/or in software, including in one or more signal processing and/or application specific integrated circuits.

Exemplary Operating Environment

Figure 9:
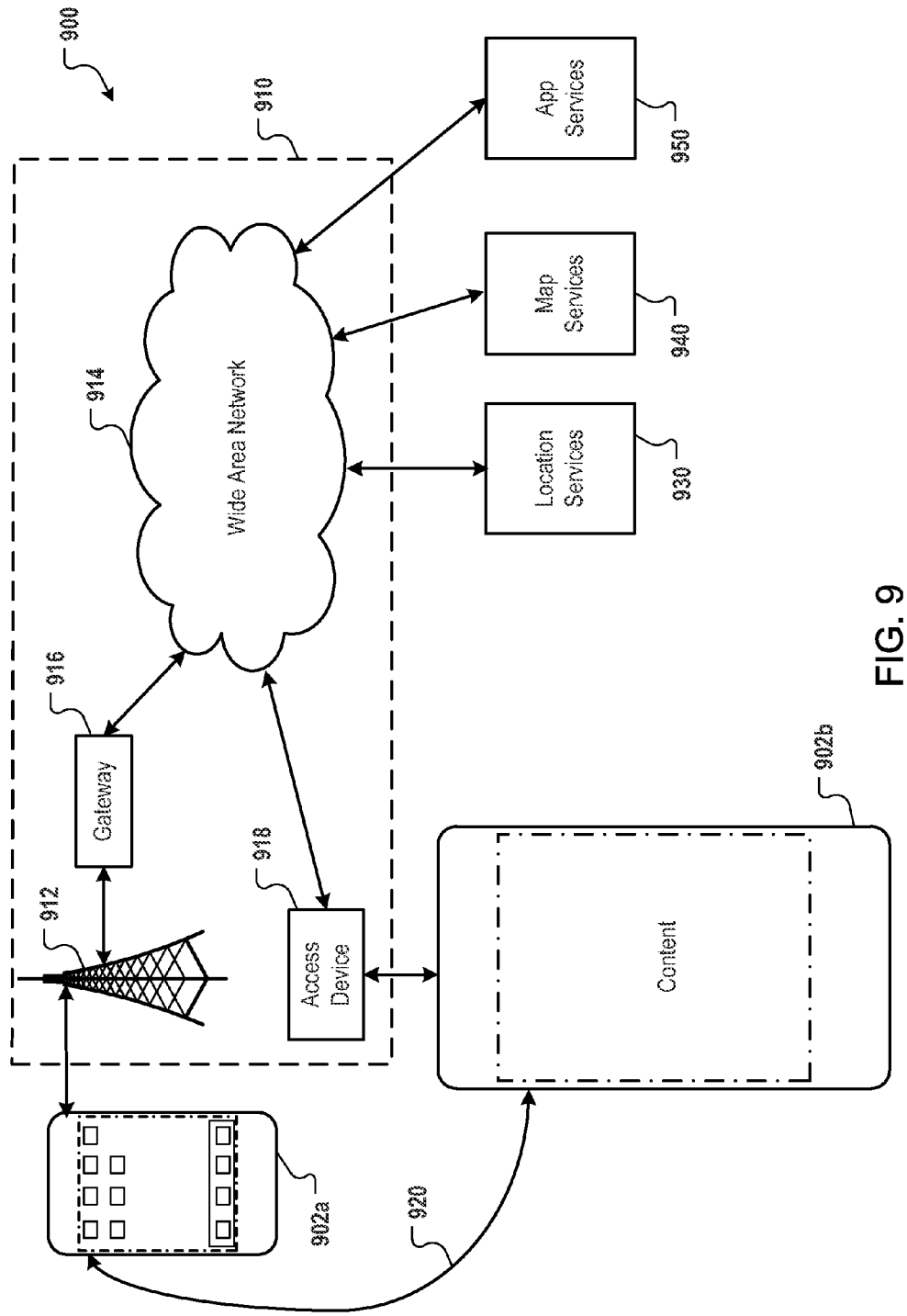
FIG. 9 is a block diagram of an exemplary network operating environment for the mobile devices implementing the features and operations of FIGS. 1-7.

FIG. 9 is a block diagram of exemplary network operating environment 900 for the mobile devices implementing the features and operations of FIGS. 1-7. Each of mobile device 902a and mobile device 902b can be mobile device 314, 316, 318, or 320 as described in reference to FIG. 3. Mobile devices 902a and 902b can, for example, communicate over one or more wired and/or wireless networks 910 in data communication. For example, a wireless network 912, e.g., a cellular network, can communicate with a wide area network (WAN) 914, such as the Internet, by use of a gateway 916. Likewise, an access device 918, such as an 802.11g wireless access point, can provide communication access to the wide area network 914. Each of mobile devices 902a and 902b can be a mobile device as described in FIGS. 1-7.

In some implementations, both voice and data communications can be established over wireless network 912 and the access device 918. For example, mobile device 902a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 912, gateway 916, and wide area network 914 (e.g., using Transmission Control Protocol/Internet Protocol (TCP/IP) or User Datagram Protocol (UDP)). Likewise, in some implementations, the mobile device 902b can place and receive phone calls, send and receive e-mail messages, and retrieve electronic documents over the access device 918 and the wide area network 914. In some implementations, mobile device 902a or 902b can be physically connected to the access device 918 using one or more cables and the access device 918 can be a personal computer. In this configuration, mobile device 902a or 902b can be referred to as a "tethered" device.

Mobile devices 902a and 902b can also establish communications by other means. For example, wireless device 902a can communicate with other wireless devices, e.g., other mobile devices, cell phones, etc., over the wireless network 912. Likewise, mobile devices 902a and 902b can establish peer-to-peer communications 920, e.g., a personal area network, by use of one or more communication subsystems, such as the Bluetooth™ communication devices. Other communication protocols and topologies can also be implemented.

Mobile device 902a or 902b can, for example, communicate with one or more services 930, 940, and 950 over the one or more wired and/or wireless networks. For example, one or more location services 930 can provide POI name, address, and corresponding locations. Map services 940 can provide a virtual map for display. The virtual map can include the POIs. Application service 950 can provide application programs for download. The application programs can each be associated with a POI.

Mobile device 902a or 902b can also access other data and content over the one or more wired and/or wireless networks. For example, content publishers, such as news sites, Really Simple Syndication (RSS) feeds, web sites, blogs, social networking sites, developer networks, etc., can be accessed by mobile device 902a or 902b. Such access can be provided by invocation of a web browsing function or application (e.g., a browser) in response to a user touching, for example, a Web object.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, application identifier, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

Exemplary System Architecture

Figure 10:
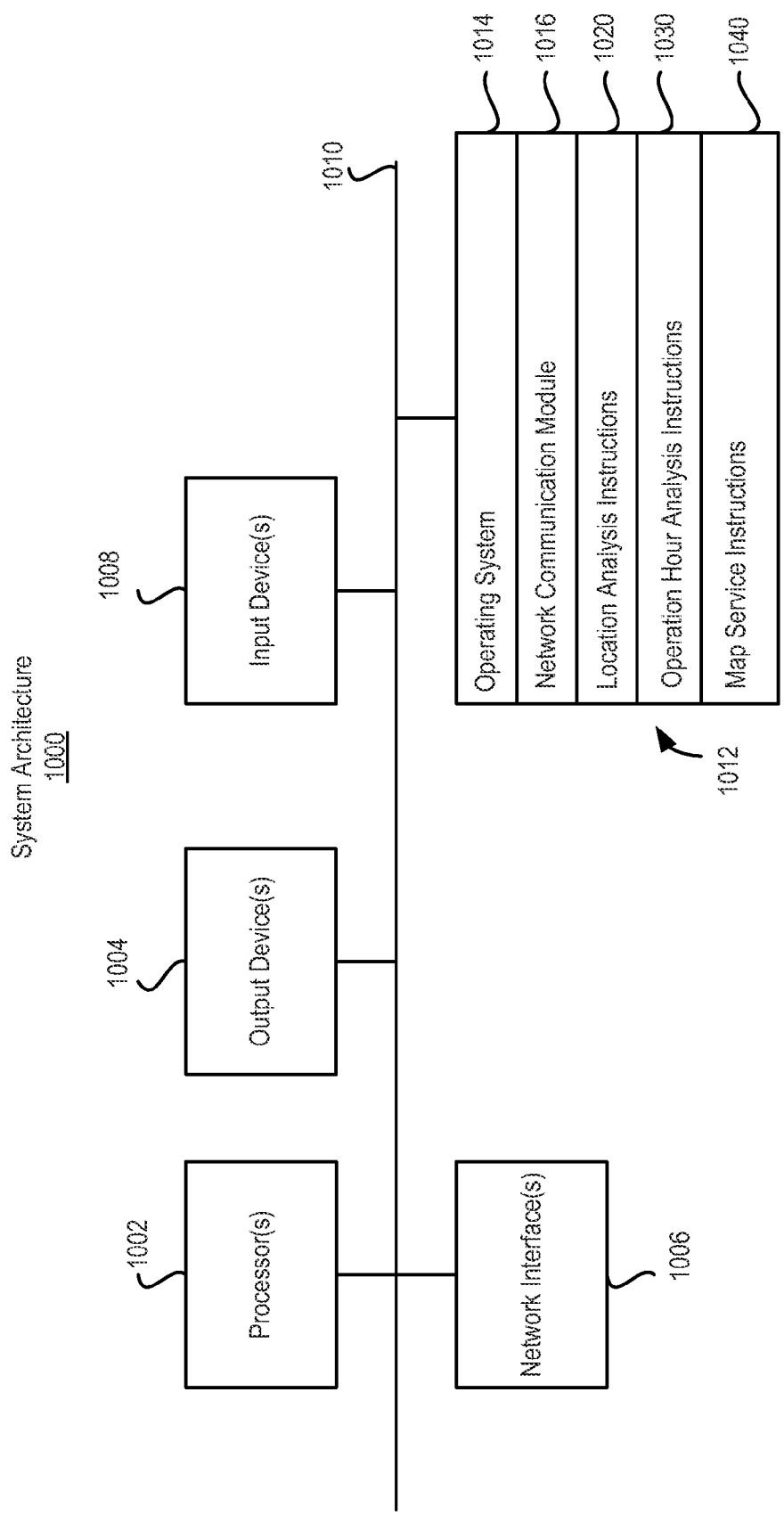
FIG. 10 is a block diagram of an exemplary system architecture for implementing the features and operations of FIGS. 1-7.

FIG. 10 is a block diagram of exemplary system architecture 1000 for implementing the features and operations of FIGS. 1-7. Other architectures are possible, including architectures with more or fewer components. System architecture 1000 can be implemented by system 300 of FIG. 3. In some implementations, architecture 1000 includes one or more processors 1002 (e.g., dual-core Intel® Xeon® Processors), one or more output devices 1004 (e.g., LCD), one or more network interfaces 1006, one or more input devices 1008 (e.g., mouse, keyboard, touch-sensitive display) and one or more computer-readable mediums 1012 (e.g., RAM, ROM, SDRAM, hard disk, optical disk, flash memory, etc.). These components can exchange communications and data over one or more communication channels 1010 (e.g., buses), which can utilize various hardware and software for facilitating the transfer of data and control signals between components.

The term "computer-readable medium" refers to any medium that participates in providing instructions to processor 1002 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1012 can further include operating system 1014 (e.g., Mac OS® server, Windows Server®, or iOS®), network communication module 1016, location analysis instructions 1020, operation hour analysis instructions 1030, and map service instructions 1040. Operating system 1014 can be multi-user, multiprocessing, multi-tasking, multithreading, real time, etc. Operating system 1014 performs basic tasks, including but not limited to: recognizing input from and providing output to devices 1006, 1008; keeping track and managing files and directories on computer-readable mediums 1012 (e.g., memory or a storage device); controlling peripheral devices; and managing traffic on the one or more communication channels 1010. Network communications module 1016 includes various components for establishing and maintaining network connections (e.g., software for implementing communication protocols, such as TCP/IP, HTTP, etc.). Location analysis instructions 1020 can include instructions that, when executed, causes processor 1002 to perform operations of anonymous application usage data analyzer 612 as described above in reference to FIG. 6, including determining a location of a POI. Operation hour analysis instructions 1030 can include instructions that, when executed, causes processor 1002 to perform anonymous application usage data analyzer 612, including determining operation hours of a POI. Map service instructions 1040 can include instructions that, when executed, causes processor 1002 to provide map information to mobile devices. The map information can include POI locations and POI operation hours.

Architecture 1000 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention.

What is claimed is:

1. A method comprising:
receiving an application program, the application program being associated with metadata indicating that the application program is associated with a point of interest (POI) in a POI database, the POI having a street address and a geocoded location including latitude longitude coordinates corresponding to the street address, the geocoded location being determined through address interpolation of the street address;
receiving, from each of a plurality of mobile devices, application usage data, the application usage data indicating an event of executing the application program by a respective mobile device, the event being associated with a device location, the device location being a location of the respective mobile device at time of executing the application program by the respective mobile device;
determining a crowd-sourced location based on the application usage data, including:
determining that device locations of the mobile devices executing the application program are concentrated within a geographic area; and
designating a centroid of the geographic area as the crowd-source location, wherein the centroid being different from the geocoded location of the POI;
designating, in the POI database, the crowd-sourced location as a location of the point of interest; and
changing a presentation of a location of the POI, wherein the crowd-sourced location, in place of the geocoded location, is presented as the location of the POI,
wherein the method is performed by one or more computing devices.

2. The method of claim 1, wherein:
the application program is a program submitted to an application store by an application provider for distribution to the mobile devices,
the metadata include at least one of an icon, a name, a description, an application category, or a link to the point of interest; and
the metadata indicates that the application program is associated with the point of interest by indicating that the application program may be executed by the mobile device at a place designated as the point of interest.

3. The method of claim 1, wherein determining that the device locations are concentrated within the geographic area comprises:
determining a location-based usage density of the device locations;
determining that, in the geographic area, the location-based usage density satisfies a location-based density threshold value; and
in response, determining that the device locations are concentrated within the geographic area.

4. The method of claim 1, wherein each the event in the application usage data is further associated with a launch timestamp, the launch timestamp indicating a time of the respective mobile device executing the application program.

5. The method of claim 4, comprising:
determining, based on the launch timestamps, that executions of the application program are concentrated within one or more time periods; and
designating, in the POI database, the one or more time periods as operation hours of the point of interest.

6. The method of claim 5, wherein determining that executions of the application program are concentrated within one or more time periods comprises:
determining a time-based density of the launch timestamp;
determining that, in the one or more time periods, the time distribution density satisfies a time-based density threshold value; and in response, determining that the executions of the application program are concentrated within one or more time period.

7. The method of claim 5, comprising determining the one or more time periods based on a daily, weekly or monthly pattern.

8. The method of claim 5, comprising determining an opening, a closing, or a relocation of the point of interest based on a change in pattern of the one or more time periods.

9. A system comprising:
one or more computing devices; and
a non-transitory storage device storing computer instructions operable to cause the one or more computing device to perform operations comprising:
receiving an application program, the application program being associated with metadata indicating that the application program is associated with a point of interest (POI) in a POI database, the POI having a street address and a geocoded location including latitude longitude coordinates corresponding to the street address, the geocoded location being determined through address interpolation of the street address;
receiving, from each of a plurality of mobile devices, application usage data, the application usage data indicating an event of executing the application program by a respective mobile device, the event being associated with a device location, the device location being a location of the respective mobile device at time of executing the application program by the respective mobile device;
determining a crowd-sourced location based on the application usage data, including:
determining that device locations of the mobile devices executing the application program are concentrated within a geographic area; and
designating a centroid of the geographic area as the crowd-sourced location, wherein the centroid being different from the geocoded location of the POI;
designating, in the POI database, the crowd-sourced location as a location of the point of interest; and
changing a presentation of a location of the POI, wherein the crowd-sourced location, in place of the geocoded location, is presented as the location of the POI.

10. The system of claim 9, wherein:
the application program is a program submitted to an application store by an application provider for distribution to the mobile devices,
the metadata include at least one of an icon, a name, a description, an application category, or a link to the point of interest; and
the metadata indicates that the application program is associated with the point of interest by indicating that the application program may be executed by the mobile device at a place designated as the point of interest.

11. The system of claim 9, wherein determining that the device locations are concentrated within the geographic area comprises:
determining a location-based usage density of the device locations;
determining that, in the geographic area, the location-based usage density satisfies a location-based density threshold value; and
in response, determining that the device locations are concentrated within the geographic area.

12. The system of claim 9, wherein each the event in the application usage data is further associated with a launch timestamp, the launch timestamp indicating a time of the respective mobile device executing the application program.

13. The system of claim 12, the operations comprising:
determining, based on the launch timestamps, that executions of the application program are concentrated within one or more time periods; and
designating, in the POI database, the one or more time periods as operation hours of the point of interest.

14. The system of claim 13, wherein determining that executions of the application program are concentrated within one or more time periods comprises:
determining a time-based density of the launch timestamp;
determining that, in the one or more time periods, the time distribution density satisfies a time-based density threshold value; and
in response, determining that the executions of the application program are concentrated within one or more time period.

15. The system of claim 13, the operations comprising determining the one or more time periods based on a daily, weekly or monthly pattern.

16. The system of claim 13, the operations comprising determining an opening, a closing, or a relocation of the point of interest based on a change in pattern of the one or more time periods.

17. A non-transitory storage device storing computer instructions operable to cause one or more computing device to perform operations comprising:
receiving an application program, the application program being associated with metadata indicating that the application program is associated with a point of interest (POI) in a POI database, the POI having a street address and a geocoded location including latitude longitude coordinates corresponding to the street address, the geocoded location being determined through address interpolation of the street address;
receiving, from each of a plurality of mobile devices, application usage data, the application usage data indicating an event of executing the application program by a respective mobile device, the event being associated with a device location, the device location being a location of the respective mobile device at time of executing the application program by the respective mobile device;
determining a crowd-sourced location based on the application usage data, including:
determining that device locations of the mobile devices executing the application program are concentrated within a geographic area; and
designating a centroid of the geographic area as the crowd-sourced location, wherein the centroid being different from the geocoded location of the POI; and
designating, in the POI database, the crowd-sourced location as a location of the point of interest, including eliminating or reducing a distortion in the latitude and longitude coordinates caused by uneven geographic features during the address interpolation by replacing, in the POI database, the geocoded location with the crowd-sourced location; and
changing a presentation of a location of the POI, wherein the crowd-sourced location, in place of the geocoded location, is presented as the location of the POI.

18. The non-transitory storage device of claim 17, wherein:
the application program is a program submitted to an application store by an application provider for distribution to the mobile devices, the metadata include at least one of an icon, a name, a description, an application category, or a link to the point of interest; and the metadata indicates that the application program is associated with the point of interest by indicating that the application program may be executed by the mobile device at a place designated as the point of interest.

19. The non-transitory storage device of claim 17, wherein determining that the device locations are concentrated within the geographic area comprises:

determining a location-based usage density of the device locations;

determining that, in the geographic area, the location-based usage density satisfies a location-based density threshold value; and in response, determining that the device locations are concentrated within the geographic area.

20. The non-transitory storage device of claim 17, wherein each the event in the application usage data is further associated with a launch timestamp, the launch timestamp indicating a time of the respective mobile device executing the application program.

21. The non-transitory storage device of claim 20, the operations comprising:

determining, based on the launch timestamps, that executions of the application program are concentrated within one or more time periods; and designating, in the POI database, the one or more time periods as operation hours of the point of interest.

22. The non-transitory storage device of claim 21, wherein determining that executions of the application program are concentrated within one or more time periods comprises:

determining a time-based density of the launch timestamp;

determining that, in the one or more time periods, the time distribution density satisfies a time-based density threshold value; and in response, determining that the executions of the application program are concentrated within one or more time period.

23. The non-transitory storage device of claim 21, the operations comprising determining the one or more time periods based on a daily, weekly or monthly pattern.

24. The non-transitory storage device of claim 21, the operations comprising determining an opening, a closing, or a relocation of the point of interest based on a change in pattern of the one or more time periods.

25. The method of claim 1, wherein movement of concentration of the plurality of mobile devices causes a change of designated location of the POI.

* * * * *